INVENTORS
LOUIS L. SIROIS
GORDON E. ALEXANDER
ARTHUR P. PAGE
ALBERT A. WINER

By J. R. Hughes
AGENT

United States Patent Office 3,578,408
Patented May 11, 1971

3,578,408
TITRATING APPARATUS
Louis L. Sirois, Albert A. Winer, and Gordon E. Alexander, Ottawa, Ontario, and Arthur P. Page, Stittsville, Ontario, Canada, assignors to Canadian Patents and Development Limited, Ottawa, Ontario, Canada
Filed Oct. 7, 1969, Ser. No. 864,488
Int. Cl. G01n 27/56, 31/16; G01r 5/28
U.S. Cl. 23—253
6 Claims

ABSTRACT OF THE DISCLOSURE

An automated potentiometric titrating apparatus for successively adding quantities of titrant to a mineral suspension when the pH recovery is at equilibrium, comprising electrodes in the suspension and connected to a pH meter and strip chart recorder, a meter relay for operating a titrant adding device, a capacitor for operating the meter relay, a programmable power supply for charging the capacitor, a variable resistance coupled to the recording pen of the strip chart recorder for operating the programmable power supply in response to changes in the pH of the suspension, and a motor driven cam operated microswitch assembly, for controlling the quantities of titrant added and the response of the meter relay, so that it is responsive to the systems indicating pH recovery of suspension.

Figure 1:
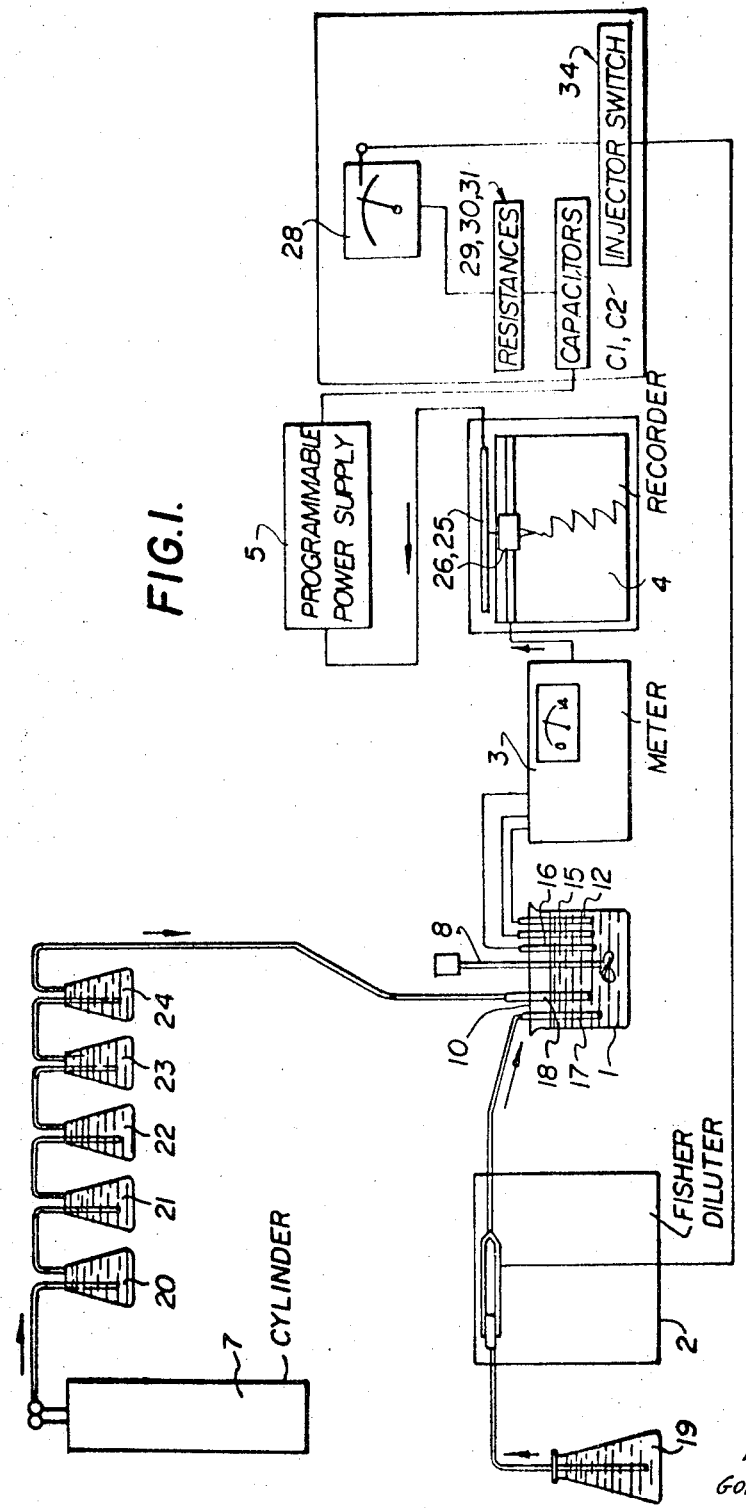

This invention relates to a method of and apparatus for titrating.

A knowledge of the electrical surface characteristics of minerals is important in the choice of treatment to upgrade and beneficiate the minerals. At solid-liquid contacts of minerals and solutions, in aqueous suspensions, the transference of ionic species occurs. These ionic species are called "potential determining ions" and determine the sign of the surface charge of the solid in the suspension. In the case of insoluble oxide minerals these ionic species are the $H^+$ and $OH^-$ ions.

The two main methods that have been widely used to measure surface electric phenomena are electrophoresis and streaming potential. When using electrophoresis, only the mobility of small particles due to the applied potential gradient can be measured, since particles larger than 10 micrometers settle too fast. The streaming potential method requires large particles, 65 mesh or larger, to permit a solution to stream through a plug of the mineral under study. These two main methods thus do not give any information about the surface charges of particle sizes between 200 and 10 micrometers, a region where most mineral dressing concentration is done. Potentiometric titration can be used with particles of any size and therefore can be applied to fill this information gap.

In addition, electrophoresis is not very accurate in the pH regions below 2, above 10 and at the neutral point of 7. Great care must be exercised in these regions.

Potentiometric titration can overcome these difficulties by titrating in these difficult regions as easily as in the other pH regions.

The surface electrical data which is of most use for insoluble oxide minerals in mineral processing is the zero-point of charge which is the pH at which the adsorption of $OH^-$ and $H^+$ is equal and the effective surface electrical potential is zero. All three methods described above will give zero-points of charge directly. Electrophoresis and the streaming potential method provide additional quantitative measurement of zeta-potentials at pH other than the zero-point-of-charge, but will not give any data for 10 micrometers to 65-mesh particles. Potentiometric titration can be used to obtain the zero-point-of-charge for the whole range of particle sizes normally encountered and also enables the estimation of relative surface charges, and in addition will also measure the zero-point-of-charge accurately in all ranges of pH, which is difficult by electrophoresis.

There are many automatic titrators in use but their main purpose is to titrate to an end-point on a continuous basis. When titrating to evaluate surface charges of minerals, the system differs in that equal volumes of titrants must be added at unpredictable intervals during a run, not in a continuous stream, and that before another addition is injected, the reaction between mineral and titrant and solution must come to a relative equilibrium.

It is one object of the present invention to provide an automatic titrator, which will for example evaluate the surface charges of minerals, wherein known volumes of a titrant are added at unpredictable intervals during the titration, and wherein the reaction between the mineral and titrant and solution must come substantially to equilibrium before another volume of titrant is added.

According to the invention there is provided a titrating apparatus, comprising a reaction vessel, titrant adding means, for adding at intervals predetermined quantities of a titrant to said vessel when a predetermined quantity of a sample in a liquid carrier is placed therein as a suspension, said quantities of titrant being increments of the total that is required to obtain a representative curve of the rate of change of pH of the sample with respect to time, titrant adding control means for actuating said titrant adding means to add each of said predetermined quantities in response to the said pH determining means indicating that the pH recovery of the sample has moved substantially toward equilibrium.

In the accompanying drawings which illustrate by way of example, an embodiment of the invention.

FIG. 1 is a diagrammatic view of an automatic potentiometric titrating apparatus.

Figure 2:
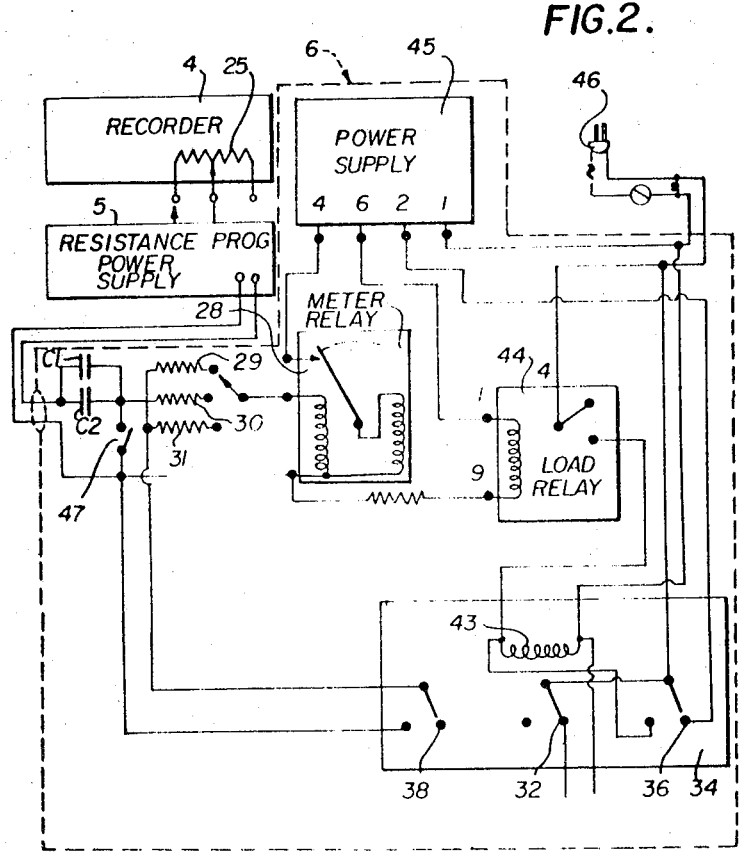
Figure 3:
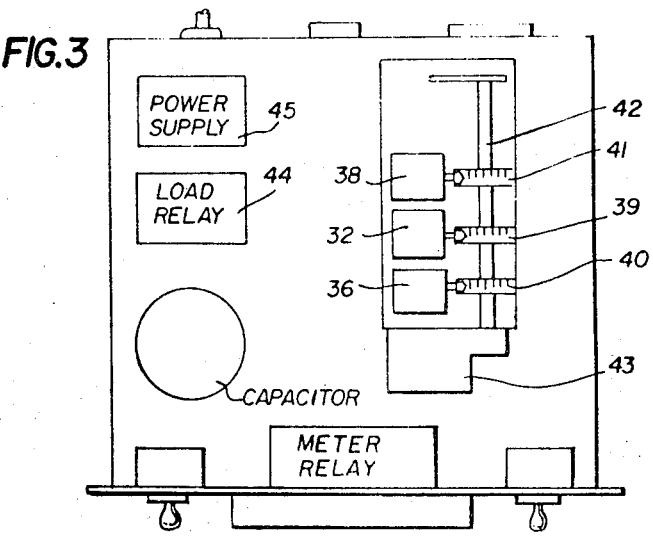
Figure 4:
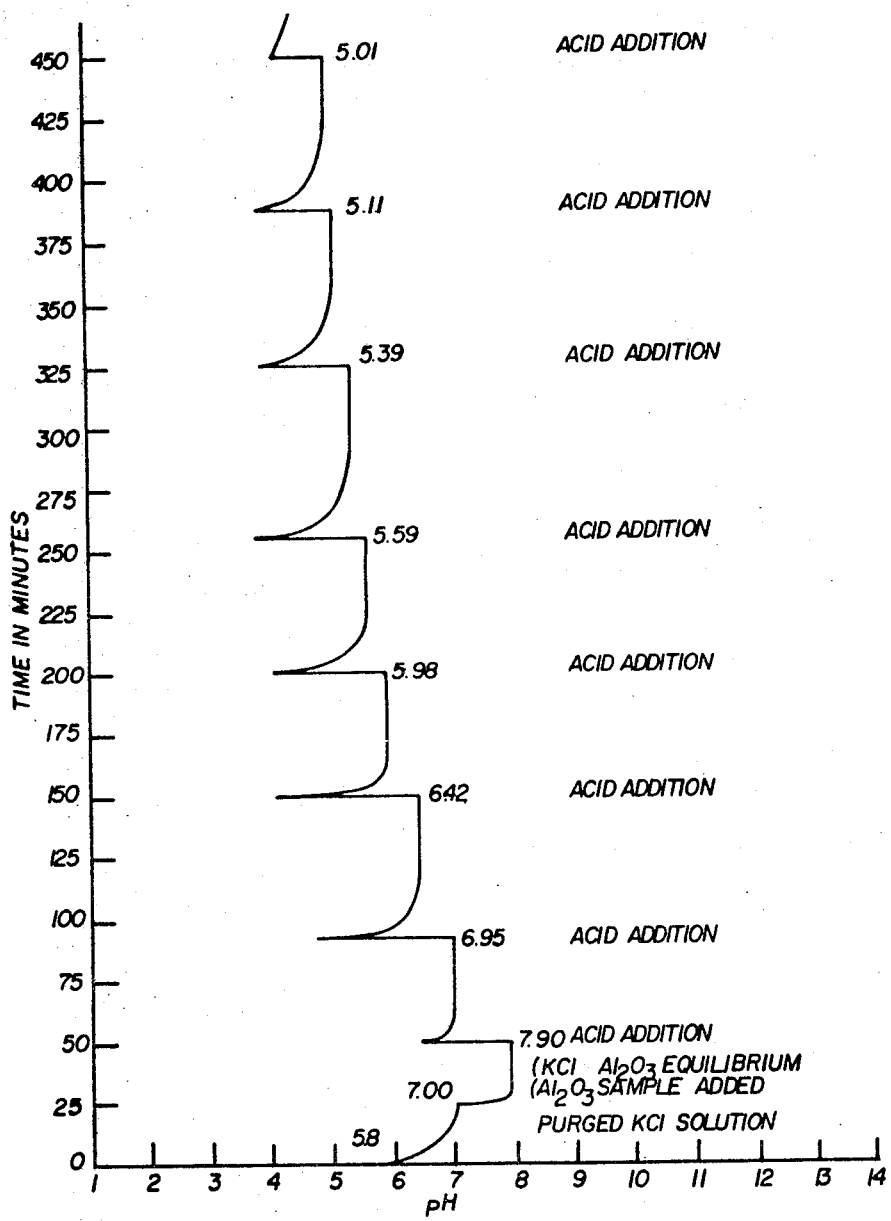

FIG. 2 is a circuit diagram of a control circuit for controlling the addition of titrant in the apparatus shown in FIG. 1, FIG. 3 is a diagrmmatic view of a motor driven cam assembly for selecting the sequence of operations of the control circuit shown in FIG. 2, FIG. 4 shows a series of titration curves plotted by the apparatus shown in FIGS. 1 to 3, and FIG. 5 shows a graph illustrating the charge density of the sample indicated in the curves in FIG. 4.

In FIG. 1 there is shown a reaction vessel in the form of a soda-alumina-borosilicate glass or plastic beaker 1, titrant adding means, in this instance, in the form of a diluter 2, pH determining and recording means in the form of a pH meter 3 and a strip chart recorder 4, and titrant adding control means in the form of a programmable power supply source 5 and controller 6. A means for maintaining an inert gas in contact with a suspension in the beaker 1 is shown in the form of a nitrogen gas cylinder 7, and a stirrer 8 forming a means for agitating a suspension in the beaker 1 at a sufficiently low speed so as not to increase the surface area thereof.

The beaker 1 is sealed with a bung 10 through which extends a glass electrode 12, a standard calomel electrode 15, a temperature compensator 16, a titrant inlet tube 17, and a nitrogen gas inlet 18. The titrant tube 17 is connected to the diluter 2 and a titrant supply 19 is provided from which the diluter 2 can draw titrant. The gas cylinder 7 is connected to the tube 18 via gas scrubber flasks 20 to 24 containing 10% NaOH, 10% HCL, distilled water and glass wool, respectively.

The electrodes 12 and 15 are electrically connected to the pH meter 3, and the output of the pH meter 3 is connected to the strip chart recorder 4. A variable resistance 25 is mechanically coupled to a pen-drive 26 of the strip chart recorder 4. The strip chart recorder 4 records variations of pH with respect to time as a curve. The variable resistance 25 is connected to the input of the power supply source 5 so that variations in the resistance 25 will produce proportional changes in the voltage output from the power supply source.

In FIGS. 2 and 3 the circuitry of the controller 6 is shown together with the strip chart recorder 4, power supply source 5, and the control panel. The voltage output from the power supply source 5 is connected to the inputs of two capacitors $C_1$ and $C_2$ to charge them until the rate of change of pH indicated on the strip chart recorder 4, from the meter 3, is less than 0.01 pH unit per minute. The outputs of the capacitors $C_1$ and $C_2$ discharge exponentially through 0 to 50 microampere meter relay 28 and one of three appropriate resistances 29 to 31 which govern the discharge time. When the meter relay 28 registers a predetermined current, the diluter 2 is actuated by an injector micro-switch 32 of a cam-operated time-switch assembly 34 to add a predetermined amount of titrant. The switch assembly 34, which is a motorised, multi-cam switch assembly, comprises three micro-switches 32, 36, and 38 in all, each activated by cams 39 to 41 respectively (FIG. 3) on the output shaft 42 of a motor 43. The cams 39 to 41 each have a circumferentially adjustable stepped portion, so that each is adjustable to set the operating sequence of the micro-switches 32, 36, and 38 to set the time period when each of these switches are actuated. Micro-switch 36 is a motor drive switch for the motor 43 to enable this motor to carry on for a limited period once the micro-switch 36 is closed and micro-switch 38 is a meter short switch. The actual cams 39 to 41 used in this instance are part of a series MC Industrial timers, manufactured by Industrial Timer Corporation, Newark, N.J., U.S.A. The actual commencement of the sequence of the operation of the micro-switches is controlled by the meter relay 28, and a load relay 44. A D.C. power source 45 is provided together with a primary as power source 46, a manually operated, zero switch 47 is provided to carry out initial adjustment to the apparatus.

The pH meter 3, chart recorder 4 and DC power source 45 are all standard equipment. The diluter 2 consists of a motor driven precision syringe, a set of eccentric cams and solenoid valves.

In operation a potentiometric titration necessitates working at high ionic strength of an indifferent electrolyte, so that the adsorbed potential-determining ions can all be assigned to the solid side of the interface.

Three hundred and fifty millilitres, of say 0.01 or 0.001 N indifferent electrolyte are introduced into the beaker 1, the tip of the nitrogen gas inlet 18 is then lowered into the liquid in the beaker 1 and the liquid is purged with nitrogen until the pH meter indicated that a pH of 7 is attained. The nitrogen used to carry out the purging is purified during this operation by passage through the flasks 20 to 24.

A mineral sample of say ten to fifteen grams, is introduced into the electrolyte and the tip of the nitrogen gas inlet is retracted above the suspension to preserve a neutral atmosphere above it in the beaker 1. The suspension is then allowed to reach equilibrium with the stirrer 8 in operation. After the suspension has reached equilibrium the diluter 2 is actuated manually to add a predetermined amount of titrant to the suspension, with the needle on the meter relay 28 set at zero. The apparatus is then permitted to proceed automatically at a constant room temperature, as described below.

With the recorder 4 recording the pH indicated by the pH meter 3, the pen drive 26 of the recorder 4 then begins to control the programmable power supply 5 through the variable resistance 25. If the contacts of the meter relay 28 remain open for two minutes, no power from the power supply 45 is applied to the motor 43. When, after two minutes the contacts of the meter relay 28 close, the lead relay 44 is energized and its contacts close, applying power to the motor 43 from the power supply 45. The cam 40 advances to close the micro-switch 36 which is changed from the position shown in FIG. 2, where power is applied to the motor 43 by the load relay 44 from a primary source 46, and the micro-switch 36 now applies power to the motor 43 from the power supply 46. The cam 40 continues to advance until the micro-switch 36 is changed to the position shown in FIG. 2 once more, and the switch assembly 34, remains in the position shown in FIG. 2 until the meter relay 28 is closed once more. However, whilst power is applied to the motor 43 the micro-switch 38 is closed, by the rotation of cam 41, for a predetermined period of time, during this period the meter relay 28 and resistances 29 are shorted so that the capacitors $C_1$ and $C_2$ quickly come to equilibrium with the power supply 5. During this period the injector cam 39 closes the micro-switch 32 which causes a predetermined amount of titrant to be added by the diluter 2 to the beaker from the titrant supply 19. The charge on the capacitors $C_1$ and $C_2$ remains at equilibrium whilst titrant is added to the sample. As the meter relay 28 is shorted from the capacitor $C_1$ and $C_2$ during this period it is not affected by any sudden shift in the pH of the sample due to the addition of titrant to the sample, and so will only be operative to detect variations in the pH of the sample which are due to adsorption of the titrant by the sample. Thus the meter relay 28 is only operative to detect changes in pH due to adsorption by the sample, and is inoperative during sudden changes in the pH of the solution due to the addition of the acid or base. Continued rotation of the injector cam 39 then removes the short from the capacitor $C_1$ and $C_2$. Variations in the power supply 5, caused by the pen drive 26 changing the variable resistance 25 in response to changes in the pH of the sample in the beaker 1, will initiate a charge in capacitors $C_1$ and $C_2$ which discharge through meter-relay 28 at a rate determined by the choice of series resistors 29 to 31.

At the end of two minutes the micro-switch 36 is actuated by cam 40 to remove power from the motor 43 and to apply power to the power supply 45. The electrical circuitry remains switched in this manner until the contacts of meter relay 28 close once more, and a fresh sequence of operations, as described above is initiated once again. This sequence of operations is repeated until a representative curve of change of pH with respect to time required to reach equilibrium is obtained.

Figure 5:
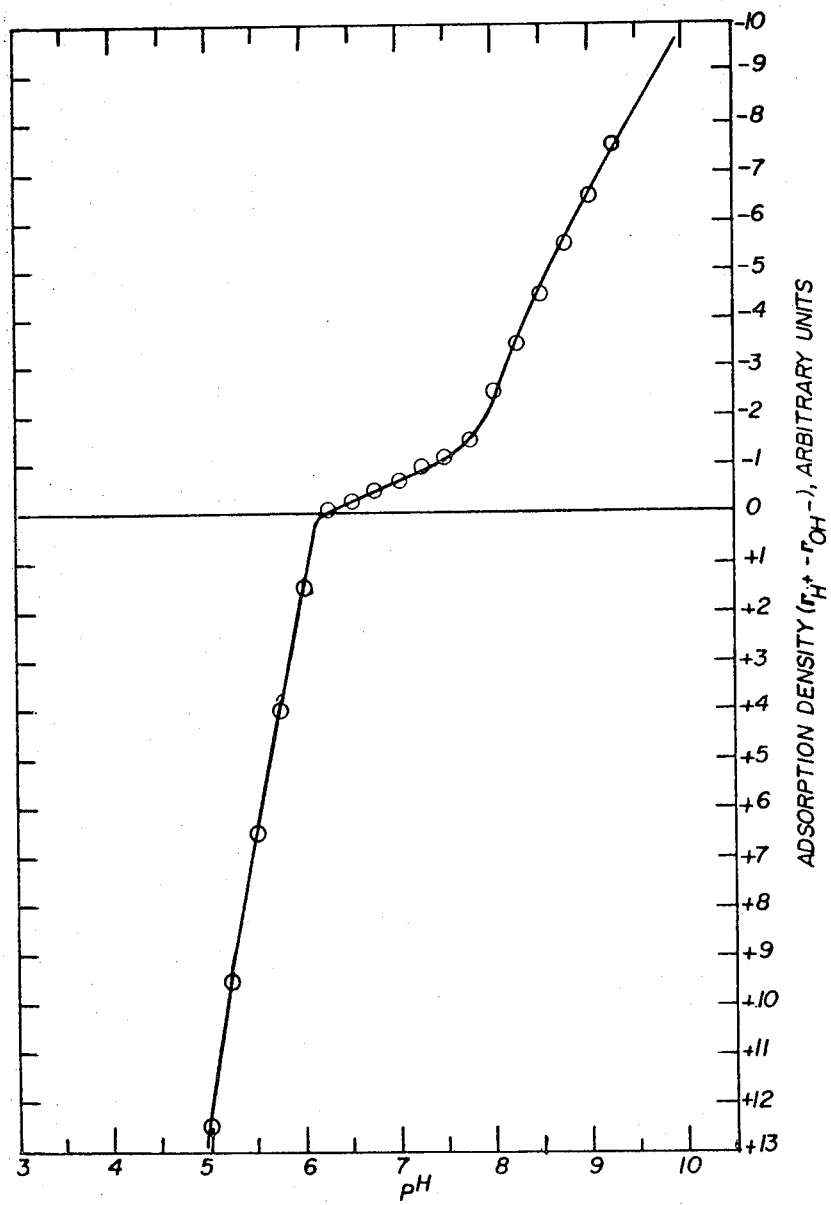

FIG. 4 shows the type of curves plotted by the recorder 4, and from these results a curve of pH versus volume of titrant, in the form of an acid or base added, can be plotted. The titration is repeated using only the indifferent electrolyte and similar curves to that shown in FIG. 4 is plotted. From the curves of FIG. 4 and those plotted for the indifferent electrolyte above, the final curve of volume of acid or base adsorbed on the mineral sample surfaces against pH is plotted. As shown in FIG. 5 instead of plotting the volume of $H^+$ or $OH^-$ against the pH, the charge density in arbitrary units may, as shown, be directly plotted against the pH.

We claim:

1. A titrating apparatus, comprising a reaction vessel, titrant adding means for adding at intervals predetermined quantities of a titrant to said vessel when a predetermined quantity of a mineral sample in a liquid carrier is placed therein, as a suspension, said quantities of titrant being increments of the total that is required to obtain a representative curve of the rate of change of pH of the suspension with respect to time, pH determining and recording means for determining and recording the rate of change of pH of the suspension with respect to time, titrant adding control means for actuating said titrant adding means to add each of said predetermined quantities in response to the said pH determining means indicating that the pH recovery of the suspension has moved substantially toward equilibrium.

2. A titrating apparatus according to claim 1, further comprising means for maintaining an inert gas in contact with the said suspension in said vessel.

3. A titrating apparatus according to claim 1, further comprising means for agitating said suspension in said vessel.

4. A titrating apparatus according to claim 1, wherein said titrant adding control means is responsive to the system's pH recovery only of said suspension.

5. A titrating apparatus according to claim 4, wherein said pH determining and recording means comprises electrodes for contacting said suspension and a strip chart recorder connected to said electrode, said titrant adding control means comprises a meter relay for operating said titrant adding means, a capacitor for actuating said meter relay, a programmable power supply for charging said capacitor, a variable resistance coupled to the recording pen of said strip chart recorder for operating said programmable power supply in response to changes in the pH of said suspension, and a motor driven, cam operated micro-switch assembly, for controlling the quantities of titrant added and the response of the meter relay, so that it is responsive to the system indicating pH recovery of said suspension.

6. A titrating apparatus according to claim 5, wherein said pH determining and recording means includes a temperature compensating device for compensating the readings on the strip chart recording for variations in the temperature of said suspension.

References Cited
UNITED STATES PATENTS

| | | | |
|---|---|---|---|
| 3,195,982 | 7/1965 | Nicholson | 23—253X |
| 3,246,952 | 4/1966 | Dawe | 23—253 |
| 3,266,504 | 8/1966 | Sundstrom | 23—253X |
| 3,275,533 | 9/1966 | Boronkay | 23—253 |
| 3,368,144 | 2/1968 | Gerdes | 324—32 |

MORRIS O. WOLK, Primary Examiner

R. E. SERWIN, Assistant Examiner

U.S. Cl. X.R.

23—230R; 204—195; 324—30R, 32